United States Patent [19]

Judkins et al.

[11] Patent Number: 5,925,168
[45] Date of Patent: *Jul. 20, 1999

[54] METHOD AND APPARATUS FOR SEPARATING GASES BASED ON ELECTRICALLY AND MAGNETICALLY ENHANCED MONOLITHIC CARBON FIBER COMPOSITE SORBENTS

[76] Inventors: Roddie R. Judkins, 9917 Rainbow Dr., Knoxville, Tenn. 37922; Timothy D. Burchell, 109 Greywood Pl., Oak Ridge, Tenn. 37830

[*] Notice: This patent issued on a continued prosecution application filed under 37 CFR 1.53(d), and is subject to the twenty year patent term provisions of 35 U.S.C. 154(a)(2).

[21] Appl. No.: 08/792,521

[22] Filed: Jan. 31, 1997

[51] Int. Cl.$^6$ .............................. B01D 53/04; B01D 49/00
[52] U.S. Cl. .................................. 95/27; 95/28; 95/138; 96/1; 96/108; 55/527
[58] Field of Search .................... 95/27, 138, 28; 96/1, 108, 2, 3; 55/527, 528

[56] References Cited

U.S. PATENT DOCUMENTS

| | | | |
|---|---|---|---|
| 3,883,328 | 5/1975 | Spain | 55/527 X |
| 3,960,522 | 6/1976 | Munzner | 95/138 |
| 4,038,050 | 7/1977 | Lowther | 96/146 X |
| 4,115,927 | 9/1978 | Rosensweig | 95/27 X |
| 4,181,513 | 1/1980 | Fukuda et al. | 55/528 X |
| 4,560,393 | 12/1985 | Way | 95/138 X |
| 4,565,727 | 1/1986 | Giglia et al. | 55/528 X |
| 4,655,796 | 4/1987 | Pirkle, Jr. | 95/27 |
| 4,668,379 | 5/1987 | Rosensweig et al. | 95/27 X |
| 4,704,139 | 11/1987 | Yamamoto et al. | 96/1 X |
| 4,734,394 | 3/1988 | Kosaka et al. | 95/138 X |
| 4,737,164 | 4/1988 | Sarkkinen | 96/146 X |
| 5,080,963 | 1/1992 | Tatarchuk et al. | 428/311.1 X |
| 5,084,184 | 1/1992 | Burns | 95/27 X |
| 5,091,164 | 2/1992 | Takabatake | 423/445 |
| 5,230,960 | 7/1993 | Iizuka | 428/902 X |
| 5,308,457 | 5/1994 | Dalla Betta et al. | 95/148 X |
| 5,397,630 | 3/1995 | Kim et al. | 55/527 X |
| 5,446,005 | 8/1995 | Endo | 502/433 |
| 5,492,677 | 2/1996 | Yoshikawa | 96/3 X |
| 5,743,940 | 4/1998 | Sugo et al. | 55/528 X |

FOREIGN PATENT DOCUMENTS

| | | | |
|---|---|---|---|
| 0689047 | 6/1964 | Canada | 96/1 |
| 55-137024 | 10/1980 | Japan | 96/1 |
| 62-097623 | 5/1987 | Japan | 95/27 |
| 5-309224 | 11/1993 | Japan | 96/1 |
| 0519219 | 8/1976 | U.S.S.R. | 95/27 |
| 0688229 | 9/1979 | U.S.S.R. | 96/2 |
| 1030318 | 7/1983 | U.S.S.R. | 95/138 |
| 1353477 | 11/1987 | U.S.S.R. | 95/27 |
| 1607901 | 11/1990 | U.S.S.R. | 96/1 |

OTHER PUBLICATIONS

R. V. Jasra et al. "Separation of Gases by Pressure Swing Adsorption" *Separation Science and Technology*, vol. 26, pp. 885–930 (1991).

G. C. Wei et al. "Development and Characterization of CBCF Insulation for Radiosotope Space Power Systems," ORNL/TM–9381 (1985).

T. D. Burchell et al. "The effect of Neutron Irradiation on the Structure and Properties of Carbon–Carbon Composite Materials" Effects of Radiation on Materials: 16th International Symposium, ASTM STP 1175, Arvind S. Kumar, David S. Gelles, and Randy K. Nanstad, Eds. American Society for Testing of Materials, Philadelphia, 1993.

M. W. Thwaites et al. "Synthesis and Characterization of Activated Pitch–Based Carbon Fibers," *Fuel Processing Technology*, to be published (1993).

*Primary Examiner*—Robert Spitzer
*Attorney, Agent, or Firm*—J. Kenneth Davis; Joseph A. Marasco

[57] ABSTRACT

A method for separating gases or other fluids involves placing a magnetic field on a monolithic carbon fiber composite sorption material to more preferentially attract certain gases or other fluids to the sorption material to which a magnetic field is applied. This technique may be combined with the known "pressure swing adsorption" technique utilizing the same sorption material.

4 Claims, 1 Drawing Sheet

METHOD AND APPARATUS FOR SEPARATING GASES BASED ON ELECTRICALLY AND MAGNETICALLY ENHANCED MONOLITHIC CARBON FIBER COMPOSITE SORBENTS

CROSS-REFERENCE TO RELATED APPLICATIONS

This invention is related to the invention described in U.S. Pat. No. 5,827,355 entitled Carbon Fiber Composite Molecular Sieve Electrically Regenerable Air Filter Media, filed on even date herewith.

Please refer to T. D. Burchell et al., U.S. patent application Ser. No. 08/747,109, filed Nov. 8, 1996 entitled Activated Carbon Fiber Composite Materal and Method of Making which is a Continuation in Part of now abandoned U.S. patent application Ser. No. 08/358,857. The entire disclosure of U.S. patent application Ser. No. 08/747,109 is herein incorporated by reference.

The United States Government has rights in this invention pursuant to contract no. DE-AC05-84OR21400 between the United States Department of Energy and Lockheed Martin Energy Systems, Inc. And contract no. DE-AC05-96OR22464 between the United States Department of Energy and Lockheed Martin Energy Research Corporation.

FIELD OF THE INVENTION

The present invention relates to methods and apparatus for enhancing the diffusion rate and separating mixtures of gases into component gases, and more particularly to methods and apparatus for separating gases based on sorption methods.

BACKGROUND OF THE INVENTION

Gas separations, for example oxygen separation from air, may be accomplished by several techniques. Most common among these techniques are cryogenic separation and pressure swing adsorption (PSA). Cryogenic separation depends on differences in boiling temperatures of the gases being separated. Through a series of compression and expansion cycles, air, for example, can be cooled to the point that oxygen (boiling point=−183° C.) condenses. At this temperature, nitrogen (boiling point=−195.8° C.) remains as a gas and thus separation of the liquid nitrogen and the gaseous oxygen can be effected by fractional distillation techniques. Cryogenic separation is, because of the compression and refrigeration requirements, relatively expensive. However, it remains one of the widely used gas-gas separation techniques and is a commercial enterprise.

Pressure swing adsorption is a technique in which a mixture of gases is passed over and/or through a sorbent material such as activated carbon at high pressure. Depending on the gas mixture, selective sorption of one of the gases can occur, thus depleting the stream of that gaseous species. The sorbed gas is then desorbed by lowering the pressure of the sorbent system (thus, the system pressure "swings" from a high to low pressure), enriching the gas stream in the sorbed species. Pressure swing adsorption is a mature technology and is economically favorable in some gas-gas separations, especially in smaller-scale systems. However, significant improvements in the process and process economics are needed.

Other techniques using sorbents may also be used to separate gases. For example, variations in temperature may be used to affect sorption and desorption of gases. Generally, gases may be sorbed at lower temperatures and by increasing temperature, the gases are desorbed. Thus, a temperature swing would be used to operate the system.

Two mechanisms, diffusion and sorption, appear to be most important in gas separations using sorbents. Consider, for example, the nitrogen-oxygen system. In a PSA process, an oxygen molecule having a smaller diameter (~3.4 Å) than a nitrogen molecule (~3.6 Å) diffuses much more rapidly than nitrogen into the sorbent pores. This difference in diffusion rate provides one of the base for separation using sorbents. The second mechanism relates to the strength of the sorption forces between the sorbent and the gases being sorbed. In the nitrogen-oxygen system, oxygen is more strongly sorbed than is nitrogen. The enhancement of these two processes in gas separation systems using sorbents is the aim of the subject invention.

OBJECTS OF THE INVENTION

Accordingly, it is an object of the present invention to provide a new and improved method and apparatus for separating mixtures of fluids which provide an alternative to cryogenic, pressure swing, and other fluid separation systems.

It is another object of the present invention to provide a new and improved method and apparatus for separating air or other mixtures of gases which can be operated at or near the pressure and temperature of the feed components.

Further and other objects present invention will become apparent from the description contained herein.

SUMMARY OF THE INVENTION

In accordance with one aspect of the present invention, the foregoing and other objects are achieved by a sorption method for separating a mixture of fluids into a first fluid which is more preferentially sorbed and a component fluid which is less preferentially sorbed which comprises the steps of: providing a sorption material having enhanced sorption affinity for the first fluid under a magnetic field; subjecting the sorption material to a magnetic field while contacting the mixture of fluids with the sorption material; eluting that component fluid which was less preferentially sorbed from contact with the sorption material; stripping the sorbed first fluid from the sorption material by imposing within the sorption material a condition selected from the group of conditions consisting of an applied electrical current which effects a temperature increase of the sorption material to strip the first fluid from the sorption material, and reducing the pressure to strip the first fluid from the sorption material, thus regenerating the sorption material for re-use; and removing the first fluid stripped from the sorption material.

In accordance with a second aspect of the present invention, the foregoing and other objects are achieved by an apparatus for separating a mixture of fluids into a first fluid which is more preferentially sorbed and a component fluid which is less preferentially sorbed which comprises: a sorption chamber having an inlet and an outlet; sorption material contained within the sorption chamber, the sorption material having enhanced sorption affinity for the first fluid under a magnetic field; means for subjecting the sorption material to a magnetic field; means for eluting that component fluid which was less preferentially sorbed from contact with the sorption material; means for stripping the sorbed first fluid from the sorption material by imposing within the sorption material a condition selected from the group of conditions consisting of an applied electrical current which effects a temperature increase of the sorption material to strip the first fluid from the sorption material, and reducing the pressure to strip the first fluid from the sorption material, thus regenerating the sorption material for re-use; and means for removing the first fluid stripped from the sorption material.

BRIEF DESCRIPTION OF THE DRAWING

In the drawing:

In FIG. 1, 1 is a pressure vessel, 2 is a three-way valve with connecting pipe 3 and fluid inlet pipe 4, 5 is a three-way valve with fluid outlet pipe 6, purge outlet pipe 7, 8 is a power supply for resistive heating with electrical supply line 9, 10 is an electrical power supply line with power supply 11 for electromagnet 12, 13 are contact strips on sorption material 14, and 15 is a purge inlet pipe.

Figure 1:
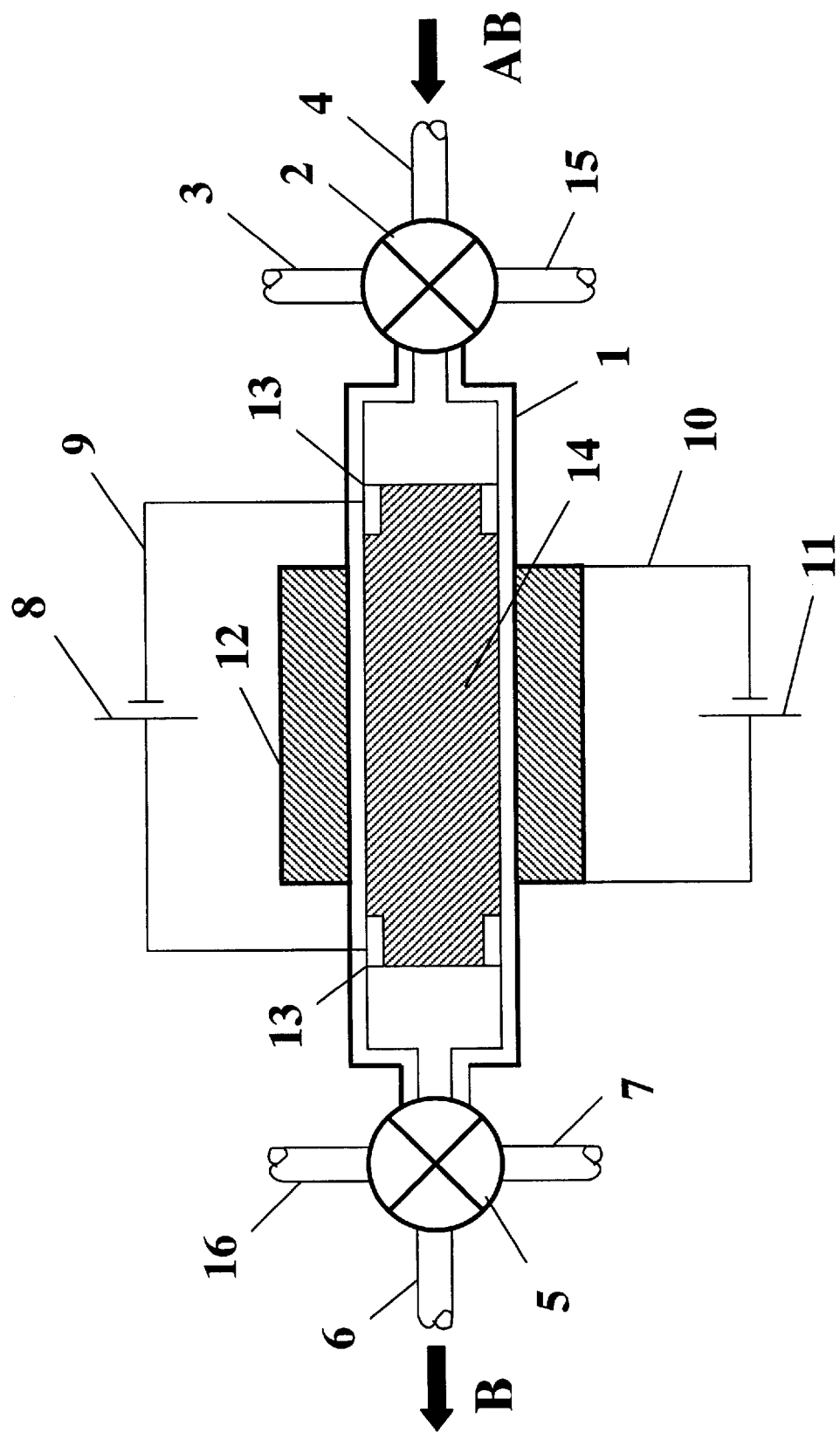
FIG. 1 is a sectional schematic view showing one embodiment of the present invention.

For a better understanding of the present invention, together with other and further objects, advantages and capabilities thereof, reference is made to the following disclosure and appended claims in connection with the above-described drawing.

DETAILED DESCRIPTION OF THE INVENTION

The subject invention embodies an electrically conductive monolithic carbon fiber composite and/or the imposition of an external magnetic field on the monolithic carbon fiber composite.

In a preferred embodiment, using a CFCMS sorption material, mixture AB of gas A and gas B flows into sorption chamber 1 via fluid inlet pipe 4 through valve 2. Under the influence of the magnetic field from electromagnet 12 energized via circuit 10 and power supply 11, species A is preferentially sorbed onto and into the CFCMS at an enhanced level causing a greater concentration of A over B in the CFCMS and a greater concentration of B over A in the gas stream. The gas stream enriched in B flows out through outlet pipe 6 via valve 5. When the CFCMS 14 is saturated with gas A the inlet gas mixture AB is switched via valve 2 to a second sorption chamber via pipe 3.

The adsorbed gas A on CFCMS 14 is desorbed by applying an electrical current via power supply 8 and electrical circuit. The voltage is normally less than about 150 volts AC or DC. Preferred voltage and current depends upon geometry and size of the CFCMS media, but in a preferred embodiment would cause heating to a temperature in excess of 300° C. A purge gas stream enters through pipe 15 and valve 2 and purges the desorbing gas A from the sorption chamber via valve 5 and pipe 7. Alternately, the electrically desorbed gas A can be evacuated from the sorption chamber by reducing the pressure via valve 5 and pipe 16. The CFCMS is thus regenerated for reuse. The separation of gases A from B on a continuous basis is achieved by utilizing a plurality of interconnected sorption chambers equipped and configured such as that depicted in FIG. 1.

The system described above, which might be used to separate oxygen from nitrogen, is cited as an example. However, the subject invention applies to any gas mixture. The subject invention may also be used singly or as a supplement to other separation systems. For example, the subject invention may be used as an enhancement of a pressure swing air (PSA) system.

Oxygen is paramagnetic (magnetic susceptibility=+ 3449.0×10$^{-6}$ cgs) and owes its paramagnetism to two unpaired electrons in each oxygen molecule. Nitrogen is diamagnetic (magnetic susceptibility =−12×10$^{-6}$ cgs). Thus, oxygen would be attracted to a magnetic field and nitrogen would be repelled from the field. By imposition of a magnetic field, the flow rates of both nitrogen and oxygen will be affected: nitrogen flow through the sorption chamber will be increased and oxygen flow through the sorption chamber will be decreased, resulting in an increased partial pressure of oxygen in the sorption chamber. The net result of these effects is improved separation of oxygen and nitrogen in the PSA system, for example, because oxygen will diffuse to the sorbent surface faster and will be sorbed more strongly than it is in the absence of a magnetic field. Conversely, nitrogen will diffuse to the sorbent surface at a slower rate and will be more weakly sorbed than it would be in the absence of a magnetic field.

In operation, the gas separation system is filled with compressed air, a magnetic field is applied to the carbon fiber monolith sorption material; the oxygen is preferentially sorbed at a higher rate as a result of the magnetic field, inducing increased oxygen concentration in the sorption material; the nitrogen-enriched residual gas is bled off; and the oxygen is stripped from the sorbent material by applying electrical current and/or evacuating the vessel. The sorbate is highly enriched in oxygen.

The example case described herein is based on the separation of nitrogen and oxygen. However, the subject invention applies to other gas—gas, gas-liquid, and liqud-liquid separations utilizing a sorbent. The subject invention may be applied to any of these systems in which the species comprising the mixture to be separated have differences in paramagnetism or diamagnetism. Although the subject invention appears most applicable to systems that require separation of paramagnetic species from diamagnetic species, it applies to other systems as well. Since all molecules possess some degree of diamagnetism, any mixture containing species differing in degree of diamagnetism have the potential for separation by this method. The subject invention can be applied by itself as a magnetic field swing sorption device, as an enhancement for pressure swing adsorption devices, and as an enhancement for thermal swing sorption devices. The subject invention applies to sorbent systems such as monolithic carbon fiber composite molecular sieve, and granular carbon.

The carbon fiber composite of the present invention is comprised generally of carbon fibers and a binder. The composite is strong and porous allowing fluids to easily flow through the material. At the same time, when activated, the carbon fibers provide a porous structure for adsorption.

Synthesis of the carbon fiber composite is generally comprised of mixing a selected carbon fiber in a water slurry with a carbonizable organic powder. The desired monolith configuration is molded from the slurry. The resulting green form is dried and removed from the mold. The composite is cured prior to carbonization under an inert gas. Once carbonized the composite is readily machined to the desired final configuration. The composite material is then activated to develop the fibers pore structure.

The fiber or fibers selected will depend upon the ultimate use of the resultant composite. The process described herein will focus on the production of a carbon fiber composite for use as a molecular sieve.

For use as an adsorbent or molecular sieve, it is preferable to use carbon fibers derived from a suitable isotropic pitch precursor.

The manufacture of pitch based fibers is well known in the art and is briefly described herein. Pitch is conventionally derived from a heavy petroleum fraction. Fiber forming methods include melt spinning and melt blowing. During both of these processes, the pitch is melted to a carefully controlled viscosity then forced through a number of fine capillaries to produce fibers as the pitch resolidifies. In the melt spinning process the fiber diameter is controlled by drawing the fibers down and winding them onto a reel as they form. The melt blowing process employs a stream of air which draws the fibers down as it blows them onto a moving belt to form a random mat of "green" pitch fibers. In both methods, extreme care must be taken to control the temperature and other conditions. Once formed, the green fibers are "stabilized", by heating the fibers in an oxidizing atmosphere, so that they are rendered thermosetting and will retain their fibrous form at the high temperatures used in the subsequent carbonization step. After carbonization, the fiber mats contain about 95% carbon by weight.

In the preferred embodiment, the isotropic pitch precursor is formed such that the resultant fibers define a diameter of approximately 10–25 $\mu$m. The fibers can be in a stabilized or carbonized condition. The fibers are cut to a selected size. For the preferred embodiment, it is preferable to cut the fibers to an average length of approximately 400 $\mu$m, and can range from 100 to 1000 $\mu$m.

The chopped carbon fibers are mixed in a water slurry with a carbonizable organic powder, such as pitch, thermosetting resin or phenolic resin. In the preferred embodiment, powdered phenolic resin is utilized.

The preferred forming method is vacuum molding, where the slurry is transferred to a molding tank and the water is drawn through a porous mold under vacuum. The material can be molded into any configuration desired such as a cylinder or plate. Obviously, the configuration will be determined by the configuration of the mold into which the slurry is transferred. Other methods of forming can be utilized such as pressure forming or various forming methods practiced in the plastics industry.

The resulting green form is dried. In the preferred embodiment, the form is dried in air at 50° C. Once dried, the form is removed from the mold.

The dried green form is then cured to produce a cured monolith. In the preferred embodiment, the composite is cured at approximately 130° C. in air. The resulting composite is carbonized under an inert gas. Preferably, the composite is carbonized for 3 hours under nitrogen at 650° C. to pyrolize the resin binder.

The composite formed by the above process defines voids between the fibers (interfiber pores) which allow free flow of fluid through the material and ready access to the carbon fiber surface The voids range from 10–500 $\mu$m in size. Further, the individual carbon fibers are held in place by the pyrolized resin binder and thus cannot move or settle due to the flow of gases through the material. The carbonized bulk density of the composite material is typically 0.3–0.4 g/cm$^3$. Assuming a theoretical density of 2.26 g/cm$^3$ (density of a single crystal pure graphite) for the composite of the present invention, at a density of 0.3–0.4 g/cm$^3$, the composite would range from approximately 82–86% porosity.

Following its manufacture, the monolithic carbon fiber composite is activated. Activation of the carbon fibers is accomplished by steam, carbon dioxide, oxygen or chemical activation. The resulting chemical reactions remove carbon and develop pores in the carbon fibers, which are classified by diameter: micropores (less than 2 nm), mesopores (2–50 nm) and macropores (greater than 50 nm).

In the preferred embodiment, the composite is steam activated in a steam/nitrogen atmosphere. The preferred activation conditions are: 800–950° C., steam at a partial pressure of 0.1–0.9 atmospheres and for durations of 1–3 hours. Burn off is calculated from the initial and final weights. Up to approximately 60% burn off, the surface area increases with burn off. The main concern with a higher burn off is the reduction in the strength of the composite. Using the manufacturing process described herein, the reduction of crush strength of the composite is almost linear with burn-off, rather than the strong exponential dependance more typically exhibited by thermally oxidized carbons. At 56% burn-off, the BET N$_2$ surface area was 1670 m$^2$/g. A crush strength of approximately 1 MPa is retained after activation. The resultant fibers in the composite define a high micropore volume, a low mesopore volume and no macropores.

The activation conditions can be varied by changing the activation gas, its concentration, the flow rate, the temperature and the optional presence of a catalyst to influence total surface area and pore size distribution. Further, the use of post activation treatments can be implemented. For example, further heating or the introduction of chemicals could affect the pore size distribution and surface chemistry.

Once carbonized or activated, the composite can be machined to any desired shape, forming a monolithic carbon fiber composite.

The resultant activated carbon fiber composite is ideal for use as an adsorbent or molecular sieve in the Pressure Swing Adsorption (PSA) process. It has a very high surface area, a narrow micropore distribution centered around mean pore widths of 5–10 Å, a high micropore volume, low mesopore volume, a high gas adsorption/desorption rate, and a permeable macrostructure through which fluid can easily pass. Further, because the carbon fiber composite is a monolith, it overcomes the settling problems associated with beds of granular activated carbon and carbon molecular sieves and thus bypass flows and pressure drops are eliminated. Moreover, the mean micropore size is controllable through the activation process thus allowing for the carbon fiber composite to be tailored for adsorption or sieving of specific gas molecules. The density and void size of the carbon fiber composite can be altered by varying the fiber length, binder content and molding conditions. The most likely initial applications are in the field of gas separations.

Although use of the carbon fiber composite as an adsorbent in the PSA process has been emphasized, with variations to process described above, there are several alternative uses. Carbon fibers derived from coal tar pitch, rayon, polyacrylonitrile (PAN) or heavy oils such as oil shale residue and refinery residue can be utilized in the production of the composite. Further, the fibers can be vapor grown. The fibers or a blend of different carbon fibers can be utilized to control the characteristics of the resultant carbon fiber composite. More specifically, the strength, thermal conductivity, pore size distribution, density and electrical properties are examples of the characteristics that can be modified or controlled with the appropriate carbon fiber or blend of carbon fibers.

By selecting a different carbon fiber and altering selected parameters in the production process, the carbon fiber composite can be modified for use in a variety of applications. For example, the carbon fiber composite can be utilized in gas purification applications and specifically air purification, especially in confined spaces where the higher rates of adsorption on activated carbon fiber composites offers potential space savings. Further, a composite with a bulk density greater than 1 gm/cm$^3$ and an active surface area greater than 1000 m$^2$/g can be utilized for gas storage. For example, the composite could be utilized as a $CH_4$ or $H_2$ storage medium or as a $CH_4$ purification medium for $CH_4$ from various sources, including land fill gases or coal bed gas. Further, a mesoporous carbon fiber composite is suitable for use in a liquid phase application or as a catalyst support.

The subject invention is anticipated to be used in many, and perhaps almost all, gas—gas, gas-liquid, and liquid-liquid separations. One of the most significant uses of the subject invention by both government and industry is in the production of oxygen and nitrogen by separation of these components from air. Other useful applications include the separation of hydrogen from petroleum refinery purge gases and the separation of impurities from gas or liquid systems such as carbon dioxide from natural gas.

While there has been shown and described what are at present considered the preferred embodiments of the invention, it will be obvious to those skilled in the art that various changes and modifications can be made therein without departing from the scope of the inventions defined by the appended claims.

We claim:

1. A sorption method for separating a mixture of fluids into a first fluid which has a magnetic susceptibility and which is more preferentially sorbed and a component fluid which has a lesser magnetic susceptibility than the first fluid and which is less preferentially sorbed comprising the steps of:

(A) Providing a sorption material comprising an activated carbon fiber composite material further comprising a multiplicity of porous carbon fibers bonded with a carbonizable organic binder to form an open, permeable structure and having enhanced sorption affinity for said first fluid in the presence of a magnetic field;

(B) Subjecting the sorption material to a magnetic field while (C) Contacting the mixture of fluids with the sorption material wherein the magnetic field operates to cause the first fluid to be preferentially diffused to the sorption material so that the first fluid is sorbed at a faster rate than the component fluid; and (D) Eluting that component fluid which was less preferentially sorbed from contact with the sorption material.

2. The method described in claim 1 further comprising the steps of:

(E) Stripping the sorbed first fluid from the sorption material by imposing within the sorption material a condition selected from the group of conditions consisting of an applied electrical current which effects a temperature increase of the sorption material to strip the first fluid from the sorption material, and reducing the pressure to strip the first fluid from the sorption material, thus regenerating the sorption material for re-use; and (F) Removing the first fluid stripped from the sorption material.

3. Apparatus for separating a mixture of fluids into a first fluid having a magnetic susceptibility which is more preferentially sorbed and a component fluid having a lesser magnetic susceptibility than the first fluid and which is less preferentially sorbed comprising:

(A) A sorption chamber having an inlet and an outlet;

(B) Sorption material contained within the sorption chamber, said sorption material comprising an activated carbon fiber composite material further comprising a multiplicity of porous carbon fibers bonded with a carbonizable organic binder to form an open, permeable structure and having enhanced sorption affinity for said first fluid in the presence of a magnetic field;

(C) Means for subjecting the sorption material to a magnetic field;

(D) Means for contacting the mixture of fluids with the sorption material wherein the magnetic field operates so that the first fluid is preferentially diffused to the sorption material and the first fluid is sorbed at a faster rate; and (E) Means for eluting that component fluid which was less preferentially sorbed from contact with the sorption material.

4. The apparatus described in claim 3 further comprising:

(F) Means for stripping the sorbed first fluid from the sorption material by imposing within the sorption material a condition selected from the group of conditions consisting of an applied electrical current which effects a temperature increase of the sorption material to strip the first fluid from the sorption material, and reducing the pressure to strip the first fluid from the sorption material, thus regenerating the sorption material for re-use; and (G) Means for removing the first fluid stripped from the sorption material.

\* \* \* \* \*